United States Patent
Leone et al.

(10) Patent No.: US 10,036,288 B2
(45) Date of Patent: Jul. 31, 2018

(54) REGENERATIVE BRAKING POWER TO OPERATE VEHICLE ELECTRIC HEATER

(71) Applicant: Ford Global Technologies, LLC, Dearborn, MI (US)

(72) Inventors: Thomas G. Leone, Ypsilanti, MI (US); Kenneth James Miller, Canton, MI (US); Douglas Raymond Martin, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 20 days.

(21) Appl. No.: 14/855,627

(22) Filed: Sep. 16, 2015

(65) Prior Publication Data

US 2017/0074130 A1     Mar. 16, 2017

(51) Int. Cl.
*F01M 5/00* (2006.01)
*B60L 7/10* (2006.01)
*F16H 57/04* (2010.01)

(52) U.S. Cl.
CPC .............. *F01M 5/001* (2013.01); *B60L 7/10* (2013.01); *F16H 57/0413* (2013.01); *Y10S 903/947* (2013.01)

(58) Field of Classification Search
None
See application file for complete search history.

(56) References Cited

U.S. PATENT DOCUMENTS

| | | | |
|---|---|---|---|
| 5,291,960 A * | 3/1994 | Brandenburg | B60H 1/00492 123/41.14 |
| 6,687,603 B2 * | 2/2004 | Wakashiro | B60K 6/485 123/198 F |
| 8,473,177 B2 | 6/2013 | Madurai Kumar et al. | |
| 8,630,759 B2 | 1/2014 | Bauerle | |
| 9,020,674 B2 | 4/2015 | Gregg et al. | |
| 2002/0043410 A1 * | 4/2002 | Suzuki | B60K 6/445 180/65.25 |
| 2008/0029246 A1 * | 2/2008 | Fratantonio | F16H 57/0412 165/103 |
| 2011/0178665 A1 * | 7/2011 | Yoshioka | B60W 10/06 701/22 |
| 2013/0213335 A1 * | 8/2013 | Thomas | B60L 1/12 123/142.5 R |
| 2013/0297138 A1 * | 11/2013 | Fushiki | B60W 20/00 701/22 |
| 2016/0090096 A1 * | 3/2016 | Cauthen | B60W 30/194 701/22 |
| 2016/0332520 A1 * | 11/2016 | Miller | B60L 1/02 |

* cited by examiner

*Primary Examiner* — James A Shriver, II
*Assistant Examiner* — Hilary L Johns
(74) *Attorney, Agent, or Firm* — David B. Kelley; Brooks Kushman P.C.

(57) ABSTRACT

A vehicle includes an electric machine configured to recharge a battery through regenerative braking, an electric heater configured to heat a powertrain lubricating oil, and a controller. The controller, in response to a temperature of the powertrain lubricating oil being less than a threshold, directs regenerative braking power to the electric heater.

15 Claims, 2 Drawing Sheets

REGENERATIVE BRAKING POWER TO OPERATE VEHICLE ELECTRIC HEATER

TECHNICAL FIELD

The present disclosure relates to hybrid and electric vehicles, and methods of redirecting regenerative braking power to warm lubricating oils.

BACKGROUND

Internal combustion engines operate more efficiently once the engine coolant and the engine oil have each reached optimal operating temperatures. Similarly, transmissions operate more efficiently once the transmission oil has reached an optimal operating temperature.

SUMMARY

A vehicle includes an electric machine configured to recharge a battery through regenerative braking, an electric heater configured to heat a powertrain lubricating oil, and a controller programmed to, in response to a temperature of the powertrain lubricating oil being less than a threshold, direct regenerative braking power to the electric heater.

A method of heating transmission oil in a hybrid vehicle includes generating power with an electric machine via regenerative braking, and directing the power from the electric machine to a heater in order to heat the transmission oil in response to a temperature of an engine coolant being greater than a threshold.

A vehicle includes an engine, an electric machine configured to recharge a battery through regenerative braking, an electric heater configured to selectively heat an engine coolant, transmission oil, or engine oil, and a controller programmed to, while a total regenerative braking power exceeds a charging rate limit of the battery, direct regenerative braking power to the electric heater to heat the transmission oil in response to a temperature of the engine coolant exceeding an engine coolant threshold and direct regenerative braking power to the electric heater to heat the engine oil in response to a temperature of the transmission oil exceeding a transmission oil threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
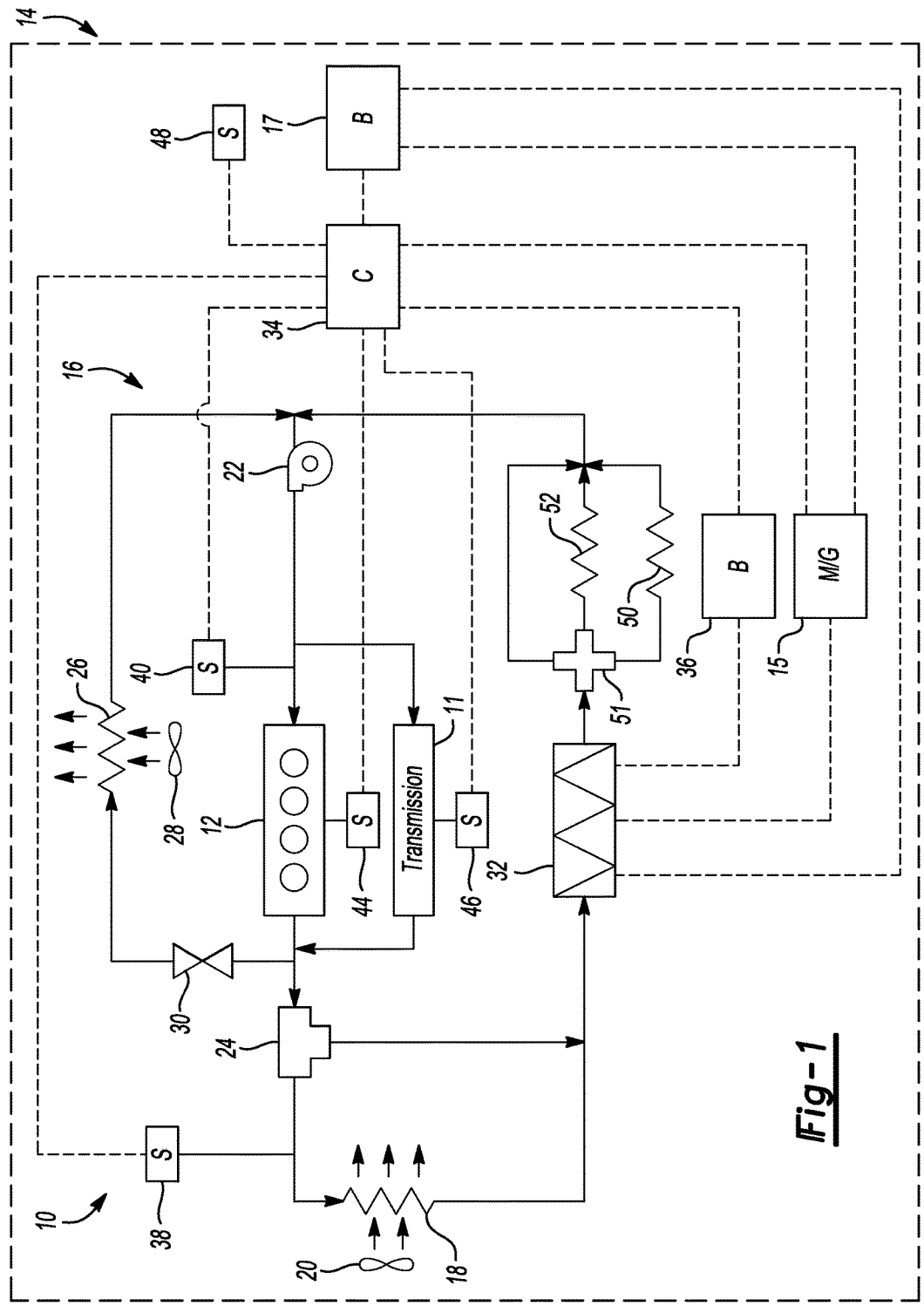
FIG. 1 is a schematic illustration of a cooling system for an engine in a hybrid electric vehicle.

Referring to FIG. 1, a schematic diagram of a cooling system 10 of an engine 12 for a vehicle 14 is illustrated according to an embodiment of the present disclosure. The engine 12 transfers torque through a transmission 11 to wheels (not shown) in order to propel the vehicle 14. If the vehicle 14 is a HEV (hybrid electric vehicle), the engine 12 or a motor/generator (M/G), or alternatively electric machine 15 may transfer torque through the transmission 11 to the wheels to propel the vehicle 14. In the HEV configuration, a traction battery 17 supplies power to the M/G 15 to propel the vehicle 14.

The cooling system 10 includes a series of cooling loops 16. A coolant is cycled through the cooling loops 16 in order to remove excess heat from the engine 12. The cooling loops 16 may include at least one heat exchanger that is configured to remove the excess heat from the coolant. For example, excess heat may be transferred from the coolant to the external surroundings of the HEV 14 when the coolant flows from the engine 12 and through a first heat exchanger 18 (e.g., radiator). A fan 20 may be included to direct air to flow across the first heat exchanger 18 such that heat is transferred from the coolant flowing through the first heat exchanger 18 to the air. A pump 22 is used to cycle the coolant through the cooling loops 16. A thermostat 24 may be included to cause the coolant to bypass the first heat exchanger 18 and continuously cycle the coolant through the engine 12 until an optimal operating temperature of the coolant is obtained.

A second heat exchanger 26 (e.g., cabin heater or heater core) may be utilized to transfer excess heat from the coolant to air that is flowing into the cabin of the HEV 14. A blower fan 28 is included to direct the air flowing into the cabin to flow across the second heat exchanger 26 such that heat is transferred from the coolant flowing through the second heat exchanger 26 to the air. A control valve 30 may be used to throttle or shut-off the coolant flowing through the second heat exchanger 26. The control valve 30 may be connected to a climate control system of the cabin and may be configured to open and close based on the climate demands of an occupant of the cabin. The blower fan 28 may also be connected to the climate control system and configured to operate based on the climate demands of the occupant of the cabin.

The cooling system 10 may also include an electric heater 32 that may be utilized to transfer heat to the coolant that is flowing through the cooling loops 16. The electric heater 32 may be any type of electric heater that may be used to transfer heat to a fluid, including heaters having resistance heating elements, immersion heaters, and positive temperature coefficient (PTC) heaters. The electric heater 32 may be in communication with a controller 34. The controller 34 may be configured to activate the electric heater 32 under circumstances in which it may be advantageous to transfer heat to the coolant flowing through the cooling loops 16.

The electric heater 32 may receive power via electrical wiring from the traction battery 17, an accessory battery 36 (such as a 12 V battery commonly found in automobiles), an alternator (not shown), the M/G 15, or any other power source that may be included in the HEV 14. The electric heater 32 may be configured to accept AC and/or DC electrical power. An AC to DC converter may be included if the electric heater 32 is configured to operate only on DC electrical power and the power source (e.g., alternator or M/G 15) is configured to generate AC electrical power. A DC to AC converter may be included if the electric heater 32 is configured to operate only on AC electrical power and the power source (e.g., battery) is configured to generate DC electrical power.

The controller 34 may also be in communication with the traction battery 17, accessory battery 36, M/G 15, alternator, or any other power source that may be utilized to power the electric heater 32. The controller 34 may coordinate which power source will be utilized to power the electric heater 32 when conditions exist where it would be advantageous to transfer heat to the coolant in the cooling loops 16. For example, the traction battery 17 may be used to power the electric heater 32 if the traction battery 17 is sufficiently charged, the accessory battery 36 may be used to power the electric heater 32 if the accessory battery 36 is sufficiently charged, the M/G 15 may be used to power the electric heater 32 if the M/G 15 is operating as a generator, or the alternator may be used to power the electric heater 32.

The controller 34 may also be in communication with a series of sensors that are configured to communicate to the controller 34 certain conditions of the HEV 14 or the surrounding environment. At least one coolant temperature sensor may be configured to communicate the temperature of the coolant in the cooling loops 16 to the controller 34. In the illustrated embodiment, a first coolant temperature sensor 38 is shown on the outlet side of the engine 12 and a second coolant temperature sensor 40 is shown on the inlet side of the engine 12. The disclosure however should not be construed as limited to this configuration, but should be construed to include cooling systems that have one or more coolant temperature sensors that may be disposed at any location within the cooling loops 16.

At least one engine oil temperature sensor 44 may be configured to communicate the temperature of the engine oil to the controller 34. The engine oil temperature sensor 44 may be disposed at any appropriate location within the engine 12 that is capable of providing an accurate oil temperature reading. At least one transmission oil temperature sensor 46 may be configured to communicate the temperature of the transmission oil to the controller 34. The transmission oil temperature sensor may be disposed at any appropriate location within the engine 12 that is capable of providing an accurate oil temperature reading. At least one ambient air temperature sensor 48 may be configured to communicate the temperature of the surrounding environment to the controller 34.

The cooling system 10 is meant for illustrative purposes only and should not be construed as limited to the particular structure and configuration shown in FIG. 1. For example, the order or position of the cooling loops 16 (or components located within the cooling loops) may be reorganized or rearranged; the cooling system 10 may include an overflow tank or degas bottle; the cooling system 10 may include additional cooling loops that are used to cool other components of the HEV 14.

It may be advantageous to operate the electric heater 32 in order to increase the temperature of the coolant under certain circumstances. Internal combustion engines (including engine 12) operate more efficiently once the temperature of the engine is at or above a temperature threshold. When an internal combustion engine is operating at a temperature below the temperature threshold, internal engine friction losses (including friction losses that occur at the piston to cylinder ring interfaces, various bearings, and valve train components) may increase. This is a function of local engine oil and metal temperatures which are influenced by engine coolant temperature. Also, fuel tends to form a film on the internal surfaces of the air intake components of the engine, which disrupts the air/fuel control system resulting in increased emissions from of the engine. The electric heater 32 may be operated to increase the temperature of the coolant, which in turn will increase the temperature of the engine 12, when the engine 12 is operating below a temperature threshold. The temperature threshold of an engine for efficiency purposes may coincide with a minimum operating temperature of the coolant that ranges between 180° F. and 220° F. The temperature threshold of the engine for emission purposes may coincide with a minimum operating temperature of the coolant that ranges between 110° F. and 140° F.

The engine 12 may shut down under certain circumstances to save fuel and increase fuel efficiency. When the engine 12 is shut down, the HEV 14 may be powered via the M/G 15, which receives electrical power from the traction battery 17. When the M/G 15 is powering the HEV 14 alone, the HEV 14 is operating in what may be referred to as EV mode (electric vehicle mode). The period of time the HEV 14 may operate in EV mode is typically limited to the amount of charge in the traction battery 17. However, the period of time the HEV 14 may operate in EV mode may also be limited by the minimum operating temperature of the coolant, in order to ensure that the engine 12 is operating above the temperature threshold for emission purposes. The electric heater 32 may be operated to increase the temperature of the coolant in order to maximize the period of time that the HEV 14 is operating in EV mode. The electric heater 32 may be operated in anticipation of an EV mode or during an EV mode. The minimum temperature of the engine coolant required to maximize the time period that the HEV 14 is in EV mode may coincide with the minimum operating temperature of the coolant for emission purposes (ranging between 110° F.-140° F.), or it may coincide with the minimum operating temperature of the coolant for efficiency purposes (ranging between 180° F.-220° F.). Alternatively, the minimum temperature of the engine coolant required to maximize a period that the HEV 14 is in EV mode may be a reserve temperature value that exceeds the minimum operating temperature of the coolant for emission purposes by 5° F.-40° F., or maybe a reserve temperature value that exceeds the minimum operating temperature of the coolant for efficiency purposes by 5° F.-40° F.

The electric heater 32 may also be operated to increase the temperature of the engine coolant during periods of time the second heat exchanger 26 and blower fan 28 are operating to heat air that is flowing into the cabin of the HEV 14. The minimum temperature of the engine coolant required when the second heat exchanger 26 and blower fan 28 are being used may coincide with the minimum operating temperature of the coolant for efficiency purposes (ranging between 180° F.-220° F.), or may be a reserve temperature value that exceeds the minimum operating temperature of the coolant for efficiency purposes. For example, the minimum temperature of the engine coolant required when the second heat exchanger 26 and blower fan 28 are being used may exceed the minimum operating temperature of the coolant for efficiency purposes by 5° F.-40° F.

The electric heater 32 may also be operated to increase the temperature of the engine coolant in anticipation of using the second heat exchanger 26 and blower fan 28 to heat the air that is flowing into the cabin of the HEV 14. For example, if the ambient air temperature is below a threshold (ranging between 45° F.-65° F.) and the engine coolant is operating below a desired operating temperature (ranging between hundred 180° F.-220° F.), it may be advantageous to operate the electric heater 32 due to the likely use of the second heat exchanger 26 and blower fan 28 to heat the air flowing into the cabin of the HEV 14.

It may also be advantageous to operate the electric heater 32 in order to increase the temperature of the engine oil under certain circumstances. Internal combustion engines (including engine 12) operate more efficiently once the temperature of the engine oil is at or above an optimal temperature threshold. Engine oil is more viscous at lower temperatures, which increases the friction between moving parts of the engine, resulting in a loss in efficiency. The electric heater 32 may be operated to increase the temperature of the coolant, which in turn will increase the temperature of the engine oil, when the engine oil is operating below the optimal temperature threshold. The coolant flows through the electric heater to an engine oil heat exchanger 50 to warm the engine oil. In an alternative embodiment, the electric heater 32 may be configured to directly increase the temperature of the engine oil. The optimal temperature threshold of the engine oil may range between 180° F. and 250° F.

It may also be advantageous to operate the electric heater 32 in order to increase the temperature of the transmission oil under certain circumstances. The transmission 11 operates more efficiently once the temperature of the transmission oil is at or above an optimal temperature threshold. Transmission oil is more viscous at lower temperatures, which increases the friction between moving parts of the transmission 11. The increase in friction between the moving parts of the transmission 11 may result in parasitic losses that negatively impact fuel efficiency and economy. The electric heater 32 may be operated to increase the temperature of the coolant. The coolant flows through the electric heater 32 to a transmission oil heat exchanger 52 to warm the transmission oil when the transmission oil is operating below the optimal temperature threshold. A bypass valve 51 may be used to direct engine coolant through the engine oil heat exchanger 50 or the transmission oil heat exchanger as described above. In an alternative embodiment, the electric heater 32 may be configured to directly increase the temperature of the transmission oil. The optimal temperature threshold of the transmission oil may range between 180° F. and 250° F.

Figure 2:
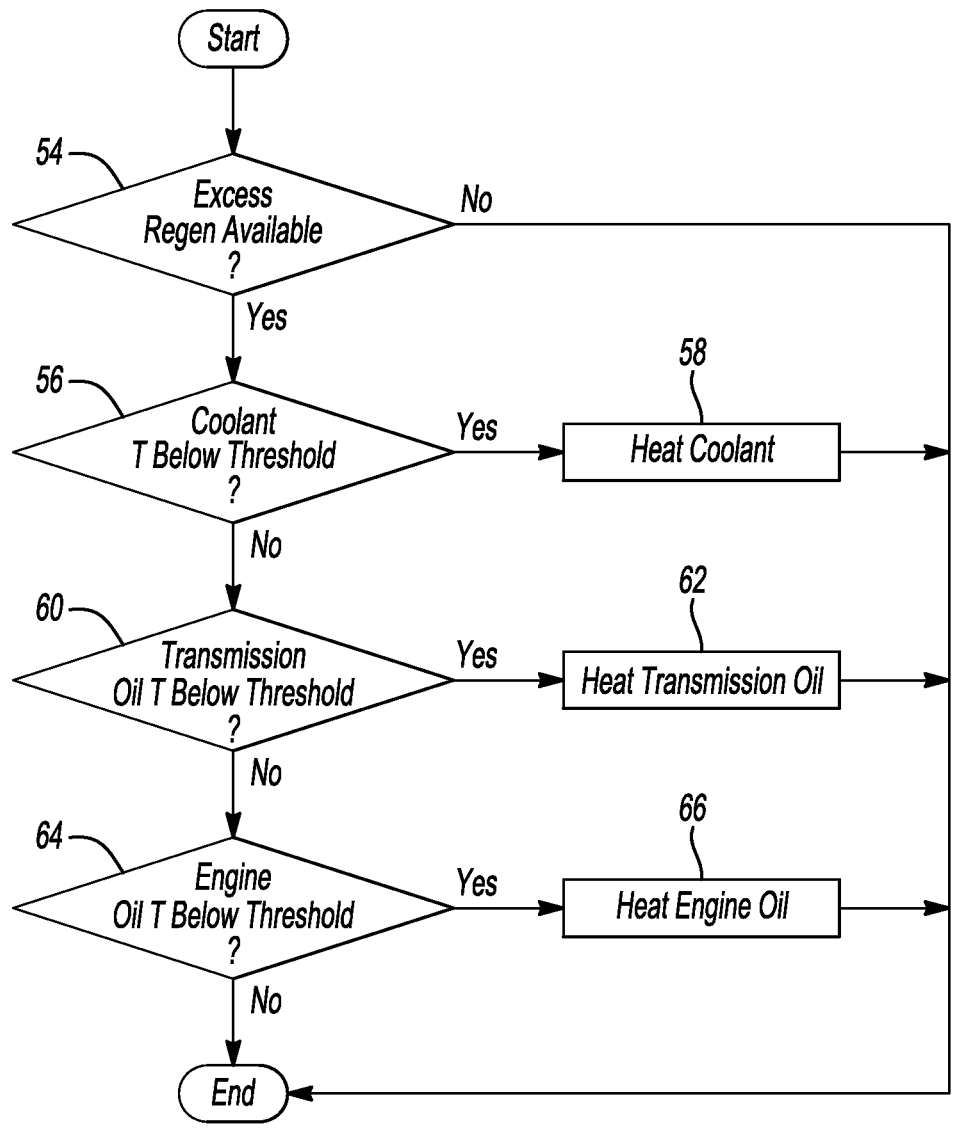
FIG. 2 is a flow chart of an algorithm for utilizing regenerative braking power to operate an electric heater in order to heat transmission and engine oils of a hybrid electric vehicle.

FIG. 2 depicts control logic for the controller 34 to determine how to use the excessive power from regenerative braking, as described above, to increase the temperature of the coolant, the temperature of transmission oil, and the temperature of engine oil. The controller 34 prioritizes power from regenerative braking to the electric heater 32 based on the temperatures of the engine coolant, the transmission oil, and the engine oil to optimize performance of the engine 12 and transmission 11. More specifically, the controller 34 directs power from regenerative braking to the electric heater 32 in order to provide a faster and more efficient warm-up time of the transmission 11 and the engine 12. Decreasing the time required for the engine 12 and transmission 11 to be sufficiently heated increases the fuel efficiency and improves performance of the vehicle 14.

At 54, the controller 34 determines if excessive regenerative braking power is available. For example, the controller 34 may determine that excessive regenerative braking power is available if a state of charge of the traction battery 17 is greater than a threshold, if the vehicle 14 is maneuvering down a hill which increases the state of charge of the traction battery 17, and if the engine coolant temperature, the transmission oil temperature, and the engine oil temperature is less than a threshold. If at 54 excessive regenerative braking power is not available, the control logic ends. If at 54, the controller 34 determines that excessive regenerative braking power is available, the controller 34 may determine if the engine coolant temperature is below a threshold at 56.

At 56, the controller 34 determines the temperature of the engine coolant and compares the temperature of the engine coolant to a value inferred from a lookup table to determine if the engine coolant is above a threshold. The controller 34 is configured to prioritize excessive regenerative braking power determined at 54 to increase the temperature of the engine coolant first. At 58, the controller 34 may be configured to use the excessive regenerative braking power to heat the engine coolant if the engine coolant is below a threshold at 56 as described above. However if at 56 the controller 34 determines that the engine coolant is above a threshold, the controller 34 may then determine if the transmission oil is below a threshold at 60.

The controller 34 may be configured to determine the temperature of the transmission oil at 60 and compare the temperature of the transmission oil at 60 to an inferred or programmed value relating to optimal performance of the transmission 11 based on the transmission oil temperatures. At 60 the controller 34 uses the comparison between the actual temperature of the transmission oil and the optimal temperature of the transmission oil to determine if the transmission oil is above or below a threshold value. If at 60 the transmission oil is below the threshold value, the controller 34 is configured to direct the excessive regenerative braking power to heat the transmission oil at 62 as described above. If at 60 the transmission oil is above the threshold value, the controller 34 may determine a temperature of the engine oil at 64.

The controller 34 may be configured to determine the temperature of the engine oil at 64 and compare the temperature of the engine oil at 64 to an inferred or programmed value relating to an optimal performance of the engine 12 based on the engine oil temperature. At 64 the controller 34 uses the comparison between the actual temperature of the engine oil and the optimal temperature of the engine oil to determine if the engine oil is above or below a threshold value. If at 64 the engine oil is below the threshold, the controller 34 may be configured to direct the excessive regenerative braking power to heat the engine oil at 66. Using the excessive regenerative braking power to heat the engine oil at 66 is consistent with the engine oil heating strategy described above. If at 64 the engine oil is above the threshold, the control logic ends.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. For example, techniques described herein may be applied to a battery electric vehicle that does not have an engine or cooling system, and in which excessive regenerative braking power is used to heat transmission or engine oils. Other arrangements are also contemplated.

What is claimed is:

1. A vehicle comprising:
   an electric machine that recharges a battery through regenerative braking;
   an electric heater configured to heat powertrain and engine oils, and engine coolant; and
   a controller programmed to, in response to a temperature of the powertrain oil exceeding a threshold and a temperature of the engine coolant exceeding an engine coolant threshold, direct regenerative braking power to the electric heater to selectively heat the engine or powertrain oils.

2. The vehicle of claim 1, wherein the regenerative braking power directed to the electric heater is a portion of total regenerative braking power.

3. The vehicle of claim 1, wherein the powertrain oil is transmission oil.

4. A method of heating transmission oil in a hybrid vehicle comprising:
   generating power with an electric machine via regenerative braking; and
   directing the power from the electric machine to a heater in order to heat the transmission oil in response to a temperature of an engine coolant being greater than a threshold.

5. The method of claim 4, wherein the power directed to the heater is a portion of total regenerative braking power that exceeds a charging rate limit of a battery.

6. The method of claim 4, wherein the threshold corresponds to a minimum coolant temperature required to maximize engine efficiency.

7. The method of claim 4, wherein the threshold corresponds to a minimum coolant temperature required for an EV mode of operation.

8. The method of claim 4, wherein the threshold corresponds to a reserve coolant temperature that exceeds a minimum coolant temperature required for an EV mode of operation.

9. The method of claim 4, wherein the threshold corresponds to a minimum coolant temperature required to satisfy cabin heating requirements.

10. The method of claim 4, wherein the threshold corresponds to a reserve coolant temperature that exceeds a minimum coolant temperature required to satisfy cabin heating requirements.

11. A vehicle comprising:
    an engine;
    an electric machine configured to recharge a battery through regenerative braking;
    an electric heater configured to selectively heat an engine coolant, transmission oil, or engine oil; and
    a controller programmed to direct regenerative braking power to the electric heater to heat the transmission oil in response to a temperature of the engine coolant exceeding an engine coolant threshold, and direct regenerative braking power to the electric heater to heat the engine oil in response to a temperature of the transmission oil exceeding a transmission oil threshold.

12. The vehicle of claim 11 further comprising a transmission oil heat exchanger associated with the transmission oil and fluidly coupled to the electric heater.

13. The vehicle of claim 12, wherein the controller is further programmed to actuate a coolant bypass valve to flow coolant through the transmission oil heat exchanger to heat the transmission oil.

14. The vehicle of claim 11 further comprising an engine oil heat exchanger associated with the engine oil and fluidly coupled to the electric heater.

15. The vehicle of claim 14, wherein the controller is further programmed to actuate a coolant bypass valve to flow coolant through the engine oil heat exchanger to heat the engine oil.

* * * * *